INVENTOR
Martin Leibow

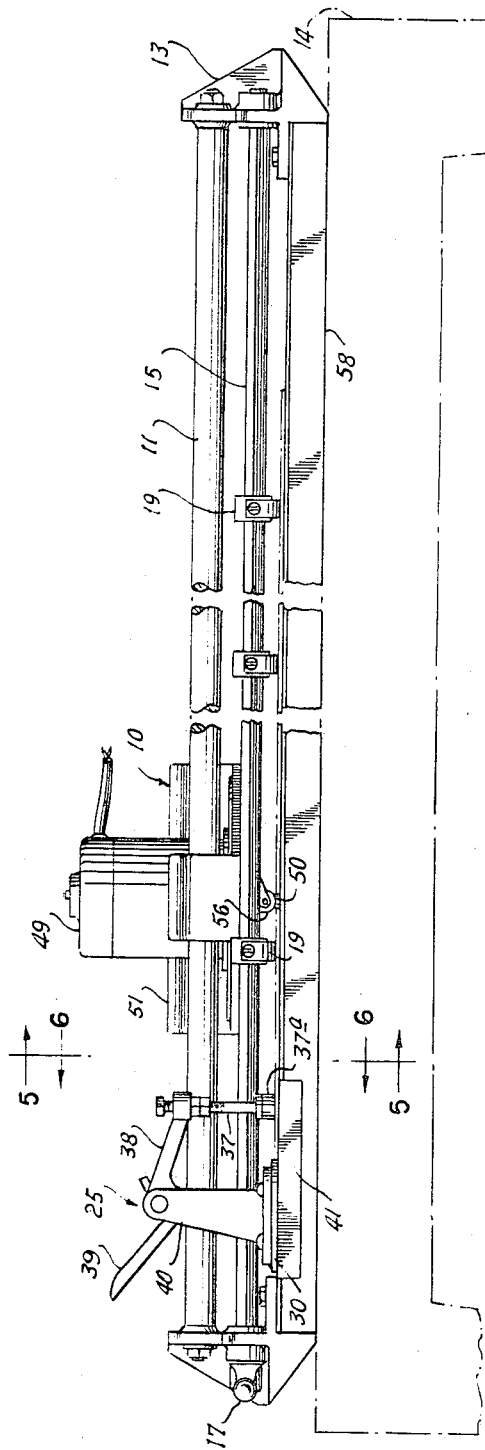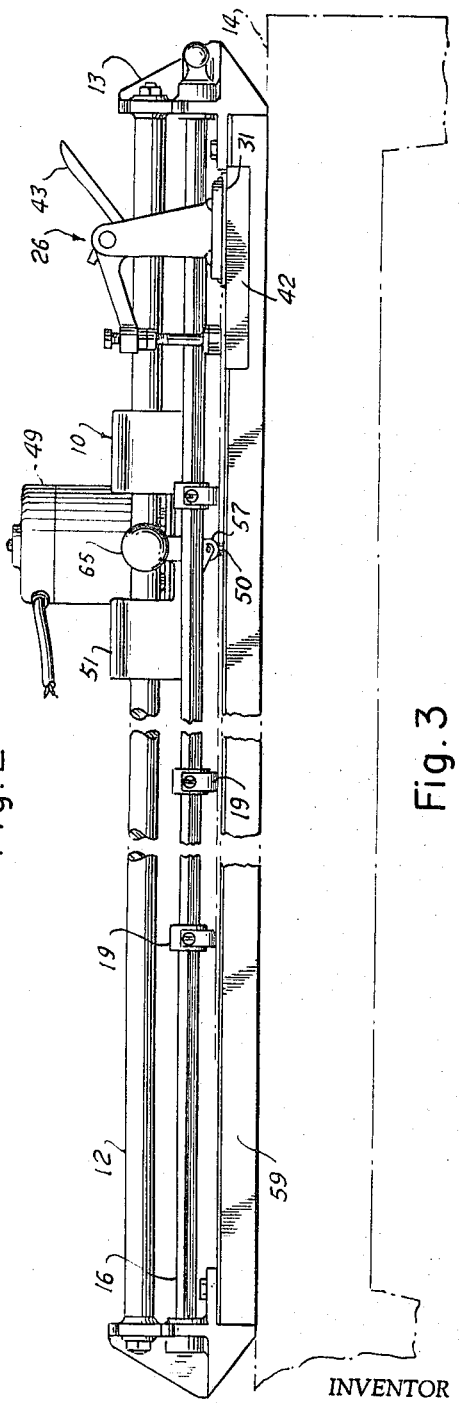

United States Patent Office 3,418,883
Patented Dec. 31, 1968

3,418,883
TRIMMING MECHANISM FOR SPLICING
OPERATION
Martin Leibow, 7007 Mason Dells, Dallas, Tex. 75230
Filed Oct. 31, 1966, Ser. No. 590,925
11 Claims. (Cl. 90—15)

This invention relates to trimming of parts to be spliced together, and more particularly to a mechanism for performing this trimming operation.

Sheets of decorative laminate of the type used for table tops, kitchen counters and shelving, or the like, often must be spliced together when a large surface is to be covered. This material, usually a laminated thermosetting plastic, is fairly hard and not easily cut and fitted for the purpose of making a splice of this type. Previously, the operations necessary to be performed on two sheets of laminate to be spliced together were rather time consuming and involved cutting or trimming the edges, fitting the mating faces together, and then filing and sanding these edges to account for irregularities in the cutting operation which may have been caused by vibration or warping of the trimmer, saw blade, or the like. Even after this lengthy operation an imperfect, unsightly joint often resulted unless carefully performed by skilled craftsmen.

It is a principal object of this invention to provide a mechanism for trimming edges of thin sheets of material such as decorative laminate in a manner such that the parts may be readily spliced together to provide an almost invisible joint. Another object is to provide an easily and rapidly operated mechanism which is adapted for simultaneously trimming the facing edges of a pair of sheets of laminate or the like so that these edges may be spliced together or abut one another on a finished surface without unsightly gaps or ridges caused by improper mating of the edges, it being of course an objective to provide a trimming mechanism which does not require careful and precise operation by skilled craftsmen to achieve a finished splice exhibiting an appearance of fine workmanship.

In accordance with this invention, a trimming mechanism is provided which trims both of the edges of the two parts to be spliced at the same time in a single operation. This trimming mechanism includes a generally horizontal bed upon which the two workpieces, which may ordinarily comprise a decorative laminate or the like, are positioned with the edges to be trimmed abutting or closely adjacent and facing one another. The bed defines a channel beneath the abutting edges which are to be trimmed, and a movable trimmer assembly, including a trimmer blade with a suitable drive mechanism such as on an electric motor, is arranged to traverse this channel by means which may include a pair of fixed bearing shafts positioned above the bed and aligned with the channel. The workpieces are positioned and held firmly in place by means including a pair of indexing bars and associated clamping assemblies, a plurality of resilient hold-down cams which may be readily released for insertion of the workpieces, and a pair of spring-loaded rollers which move along with the trimmer blade close to the point where the trimming operation occurs. The indexing bars are mounted with respect to the bed such as to provide at least two fixed positions which will permit a trimming operation for making a straight 90° splice and also for making a 45° angle splice. The clamping assemblies associated with each of the indexing bars hold the workpieces in a position firmly aligned with and abutted against these indexing bars. An important feature of a preferred embodiment of the invention is that the blade used to perform the trimming operation may be shaped such that a slight reverse bevel is formed in the trimmed edges to aid in providing a precise, almost invisible fit of the decorative parts to be spliced. Also it is significant to note that the two mating edges of the spliced parts are trimmed at the same time which aids in insuring that any variations in the linearity of the trim or cut due to vibration, bowing, or warping of the assembly will appear in mirror image in the opposed edges to be spliced so that upon mating of such edges the splice will be almost invisible even though a perfectly straight trim has not been accomplished. Furthermore, the trimming mechanism of this invention provides a one-step operation for making ready parts for splicing as opposed to prior techniques which required cutting, fitting, filing, and/or sanding by skilled operators, and still did not provide a perfect fit of the abutting edges.

The novel features believed characteristic of this invention are set forth in the appended claims. The invention itself, however, as well as other objects and advantages thereof, will be best understood by reference to the following detailed description of an illustrative embodiment, when read in conjunction with the accompanied drawings, wherein:

FIGURE 2 is an elevation view of the trimming assembly of FIGURE 1 viewed from the right-hand side;

FIGURE 3 is an elevation view of the trimming mechanism looking from the left-hand side in FIGURE 1;

Figure 10:
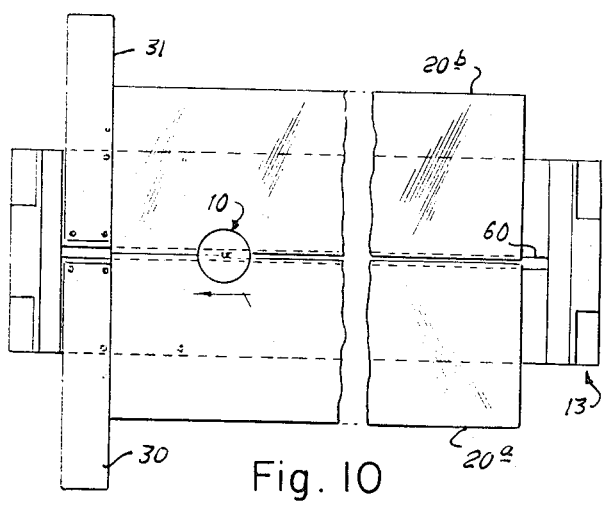
Figure 11:
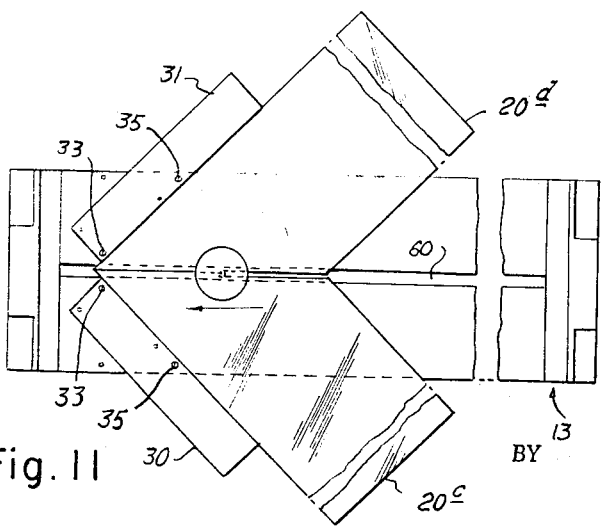

FIGURE 10 is a schematic representation of a top view of the trimming mechanism in operation in the 90° mode or for trimming two pieces for making a straight 90° splice; and FIGURE 11 is a schematic representation as in FIGURE 10 showing the 45° mode of operation for trimming two pieces for making a 45° corner splice.

Figure 1:
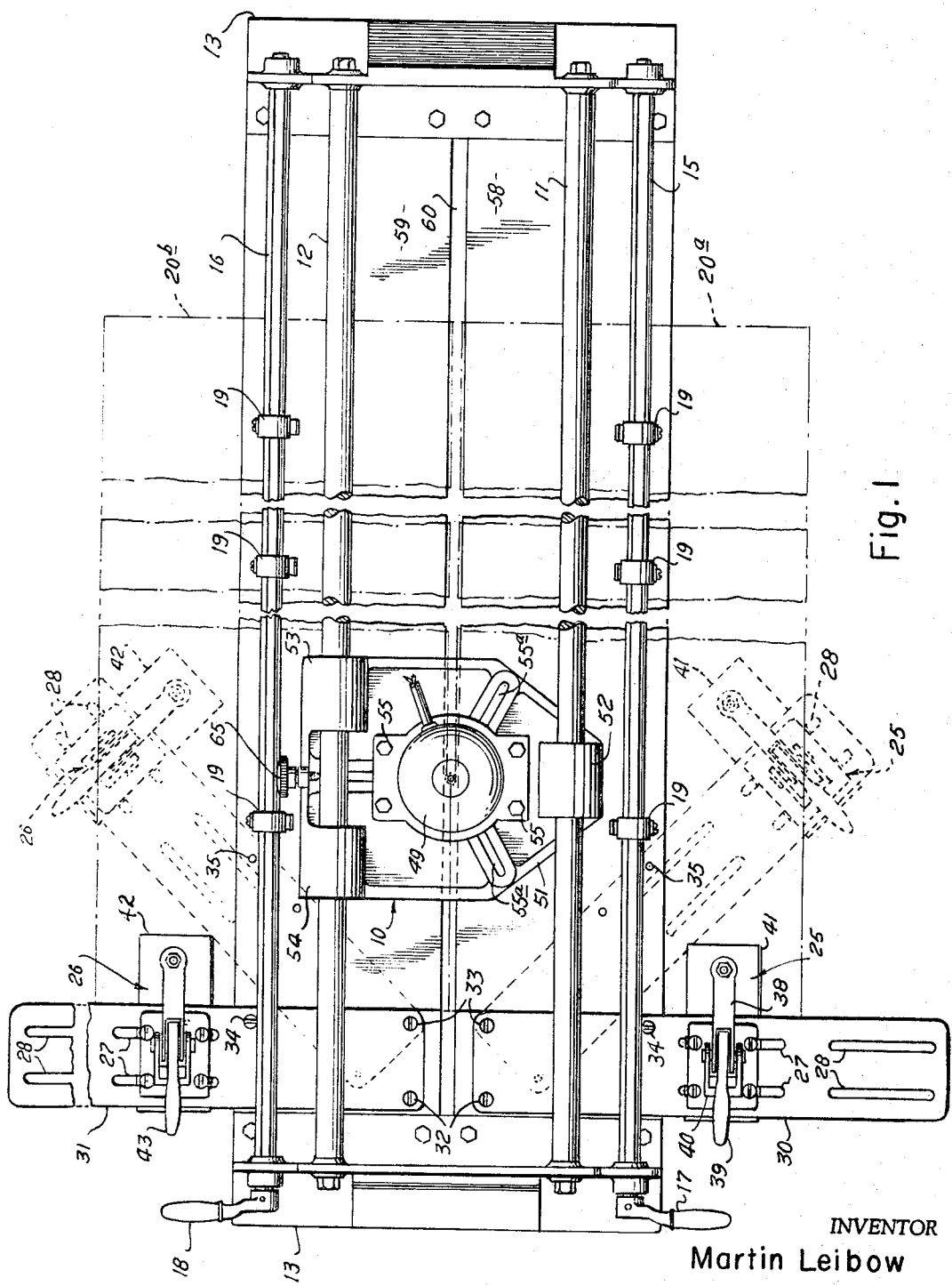
FIGURE 1 is a plan view of the trimming assembly of this invention.
Figure 4:
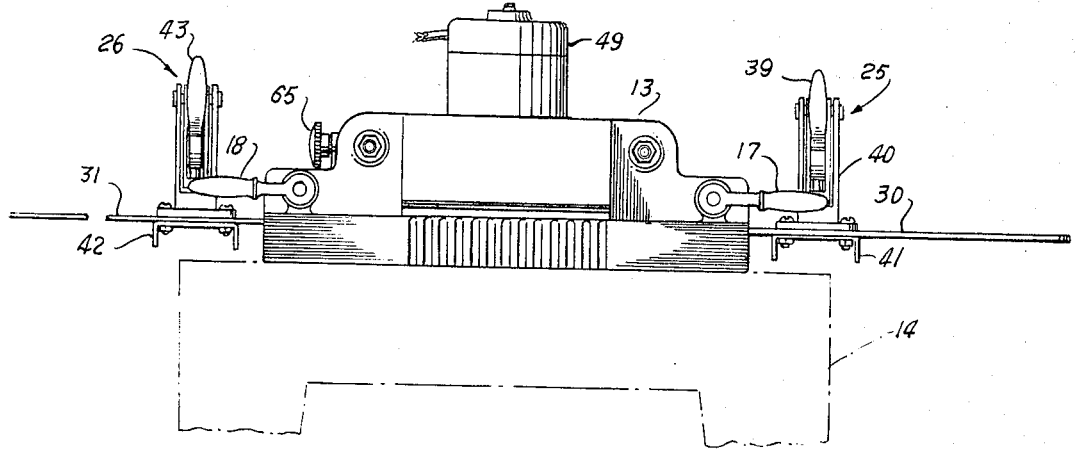
FIGURE 4 is a front elevation view of the assembly of FIGURE 1 viewed from the front or from the lower end in FIGURE 1.
Figure 5:
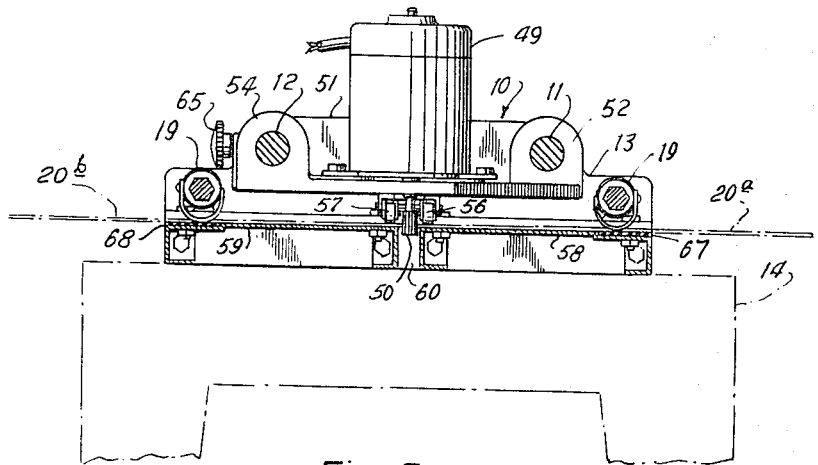
FIGURE 5 is an elevation view in section of the assembly of FIGURE 1 taken along the line 5—5 in FIGURE 2.
Figure 6:
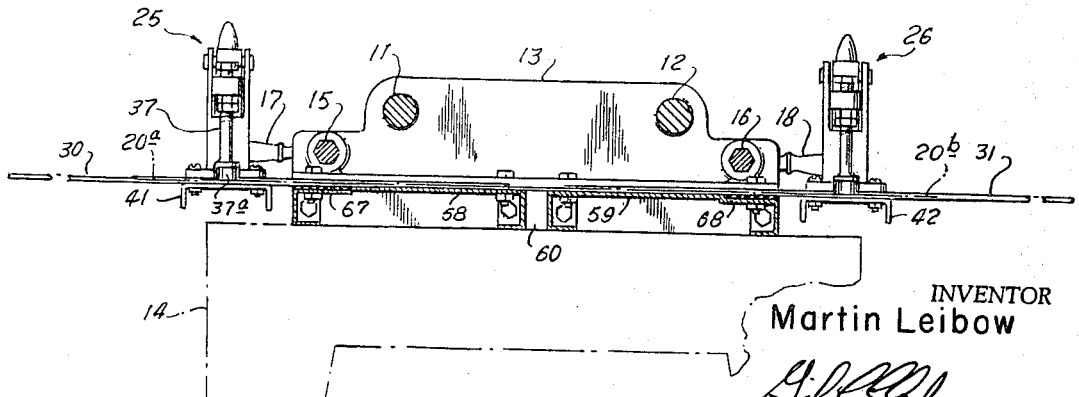
FIGURE 6 is an elevation in section of the assembly of FIGURE 1 taken along the line 6—6 in FIGURE 2.
Figure 9:
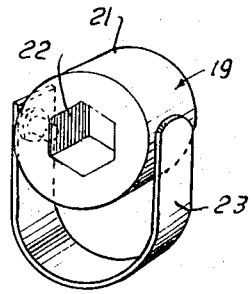
FIGURE 9 is an enlarged pictorial view of one of the hold-down cams used in the assembly of FIGURE 1.

With reference to FIGURE 1, a mechanism for performing the trimming operation of this invention is illustrated wherein a horizontally movable trimmer assembly 10 is mounted on a pair of bearing shafts 11 and 12 which are firmly secured at their ends to a frame 13. The frame 13, to which is mounted the various parts of the trimming mechanism, is supported by, and may be secured to, a suitable work table or stand 14. Also mounted on the frame 13, parallel to the bearing shafts 11 and 12 for the movable trimmer assembly 10, are a pair of hexagonal shafts 15 and 16. These shafts 15 and 16 may be rotated about their axes by means of handles 17 and 18 for the purpose of bringing to bear a plurality of spring-like hold-down cams 19 on to a pair of workpieces 20a and 20b. The hold-down cams 19 are of the form illustrated in enlarged detail view in FIGURE 9 and include a cylindrical part 21 having a hexagonal central hole 22 for engaging the shaft 15 or 16. A spring member 23 is secured at one of its ends to the cylindrical part 21 and is free at its other end, providing a spring-like action so that when the handles 17 and 18 are in a vertical position no pressure will be applied by the springs 23 to the workpieces 20a and 20b; however, when the handles 17 and 18 are rotated to the horizontal position as illustrated in the figures, the spring members 23 on each of the hold-down cams 19 will bear upon the workpiece with sufficient pressure to hold the workpiece in place. These hold-down cams 19 are free to move along the shafts 15 and 16 to accommodate various sizes of workpieces, or to provide for engagement with the workpieces in several places in both the 90° mode of operation and the 45° mode.

The workpieces 20a and 20b are also held down by a pair of clamping assemblies 25 and 26 which are secured in one or the other of two sets of slots 27 and 28 in a pair of indexing bars 30 and 31 against which the workpieces 20a and 20b are abutted and aligned. These indexing bars 30 and 31 are firmly secured to the frame 13 in one of two positions by means of bolts or other suitable fastening means. In the position for trimming two pieces at 90°, i.e. for the purpose of abutting the pieces at right angles to one another, the indexing bars 30 and 31 are each secured to the frame 13 by three bolts 32, 33, and 34, while the clamping assemblies 25 and 26 are mounted in the slots 27, as illustrated by solid lines in FIGURE 1. However, for cutting the two workpieces 20a and 20b in a manner such that the pieces are to be abutted at a 45° angle to one another, the indexing bars are pivoted about the bolts 33, which remain in place, to a position as shown in phantom lines in FIGURE 1, the bolts 32 and 34 being removed for this purpose. To hold the indexing bars 30 and 31 in the 45° position, bolts are secured in holes 35. For the 45° position, the clamp down assemblies 25 and 26 are moved to the pairs of slots 28 so that these assemblies will clear the shafts 15 and 16 and will hold the workpieces at a position about the same distance from the center as for the 90° position. The assembly 25 includes a clamping member 37 having a foot 37a composed of nylon or the like to avoid marring the workpiece, with the clamping member 37 being adjustably secured to an arm 38, the arm 38 being movable from a down or clamped position to an up or free position by a handle 39. The arm 38 and the handle 39 are both pivotally mounted on a shaft which is secured to a frame 40. The frame 40 is bolted to the top side of the indexing bar 30 by bolts in the slots 27. The clamping assembly 26 is exactly like the assembly 25 as just described, but in any event, the specific form of this clamp is not material to the invention and may be any one of a variety of devices which are commercially available. The bolts which hold the upper parts of the clamping assemblies 25 or 26 in the slots 27 also hold members 41 and 42 to the bottom sides of the indexing bars 30 and 31. The members 41 and 42 extend underneath the workpiece and below the foot 37a to provide the lower bearing surfaces for the clamping assemblies. The clamp mechanism 26 on the left-hand indexing bar 31 has an operating handle 43 corresponding to the handle 39 on the right-hand side.

Figure 7:
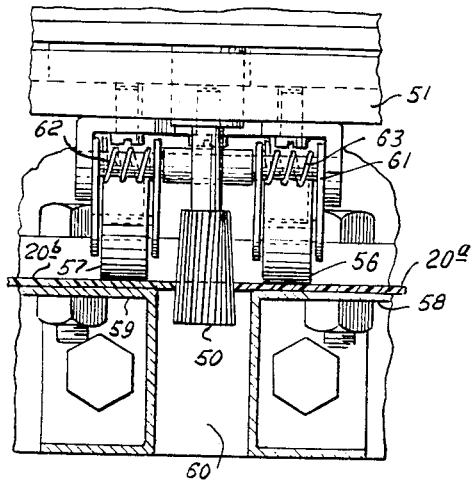
FIGURE 7 is an enlarged detail view partly in section of the central portion of FIGURE 5 and includes trimming blade and hold-down roller assembly.
Figure 8:
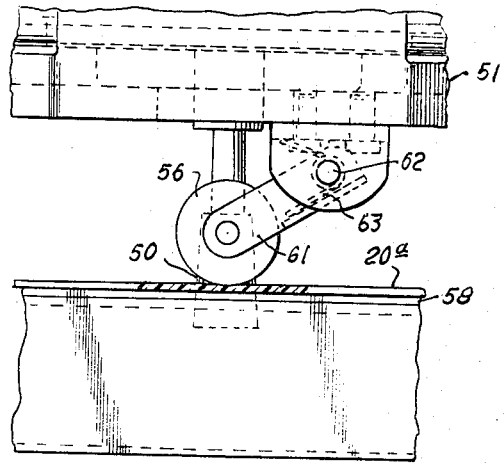
FIGURE 8 is an enlarged detail view of the trimming blade and hold-down roller as in FIGURE 7, as seen at right angle to the view of FIGURE 7.

The moving trimmer assembly 10 includes an electric motor 49 or other suitable drive mechanism having a router or trimmer blade 50 connected to the shaft thereof. It is important to note that the trimming blade 50 is of larger diameter at the lower end and tapers upward, thus providing a reverse bevel on the trimmed edges of the workpieces, this being apparent from the enlarged view of FIGURE 7. This reverse bevel aids in insuring a precise fit for the spliced decorative pieces. Of course, any desired shape could be used for the router 50 if, for example, a grooved splice were to be made or the mechanism is used for other purposes; however, for accomplishing a virtually invisible splice, this reverse bevel is very advantageous.

The movable assembly 10 further includes a motor table 51 having bearing assemblies 52, 53, and 54 for traversing the shafts 11 and 12. These may be roller or ball bearing arrangements as appropiate. The motor and its associated cutter 50 are secured to the table 51 by four bolts 55, while provision is made for mounting any other desired motor or cutting assembly in three radial slots 55a arranged at 120° with respect to one another so that the cutter may be centered with respect to the desired cutting position between the shafts 11 and 12. Secured to the motor table 51 on the underside are a pair of spring-loaded rollers 56 and 57. These rollers, preferably composed of nylon or similar material which will not mar the finish of the workpiece, are for the purpose of holding the workpieces 20a and 20b down tightly against a work-supporting bed, the bed taking the form of a pair of bearing plates 58 and 59 which in turn provide a part of the frame 13 with each end of the frame being secured to the plates 58 and 59 by bolts as illustrated. These bearing plates 58 and 59 define a channel 60 therebetween which is traversed by the trimmer blade 50. The roller 56 is mounted by a pair of arms 61 pivoted at one end about a shaft 62 and spring-loaded by a spring member 63. The roller 57 is similarly mounted. These rollers aid in avoiding chatter and vibration of the workpieces while the blade is performing the trimming operation.

The assembly 10 may be secured in a fixed position relative to the shafts 11 and 12 by a manually operated knob 65 which bears a threaded bolt adapted to engage the shaft 12. In operation, the knob 65 is turned to disengage the bolt from the shaft, permitting the assembly 10 to move freely along the bearing shafts.

It will be noted that directly beneath the hold-down clamps 19 underneath the workpiece are provided a pair of resilient strips 67 and 68 composed of rubber, nylon, or the like and recessed into the bed or bearing plates 58 and 59 for the purpose of permitting a secure clamping action without damaging the workpieces.

The operation of the cutting or splicing mechanism which has been described above will now be explained. For a straight 90° splice, the indexing bars 30 and 31 are fixed in the position shown in solid lines in FIGURE 1, or as illustrated in FIGURE 10, with the handles 39 and 43 for the hold-down clamps in the up position. Likewise, the handles 17 and 18 are in the up position so that the hold-down cams 19 are raised to allow the workpieces to be inserted. The moving trimmer assembly 10 is positioned at the back ends of the shafts 11 and 12 or in the right-hand position in the plan view of FIGURE 10 so that the rollers 56 and 57 and the cutter 50 will not engage the workpieces when initially inserted. The assembly 10 may be held in this position by operating the knob 65. Now the workpieces 20a and 20b are placed in position on top of the bed or bearing plates 58 and 59 generally as seen in FIGURE 10. The facing edges of the workpieces 20a and 20b may be abutted against one another. It is important that the left-hand edges of the workpieces as seen in FIGURE 10 are firmly abutted against and aligned with the indexing bars 30 and 31. The clamping assemblies 25 and 26 are engaged by pushing the handles 39 and 43 to the down position, then the hold-down cams 19 are pressed into engagement with the workpieces by moving the handles 17 and 18 to the down position. The mechanism is now ready for the trimming operation, which is accomplished by disengaging the knob 65 and then manually moving the trimmer assembly 10 to the left as seen in FIGURE 10 so that the trimming blade 50 will engage the inner edges of the workpieces 20a and 20b as it moves along to the left. The rollers 56 and 57 move along with the trimmer blade to hold each workpiece, near to where it is being cut, firmly down against the bearing plates. It will be noted that the indexing bars 30 and 31 are spaced far enough apart at the inner edges thereof to permit the trimmer blade 50 and rollers 56 and 57 to move between these bars and complete the cut to the furthermost left-hand edge as in FIGURE 10. Only one pass of the trimmer is needed to provide a clean, matched trim, and it will be apparent that skill and judgment of the operator are not essential to a large extent in achieving precise, reproducable results.

An important feature of this invention is that as the trimmer moves along the edges of the workpieces, any departure in a lateral direction from a straight line movement, as may be caused by bowing or vibration of the shafts 11 and 12, or the table 51, will result in variation of the linearity of the cut in exactly the same manner in both workpieces so that when the splice is made the two parts will precisely mate together even though a perfectly linear cut has not been made.

For making a 45° angle splice or corner splice the operation of the mechanism is as follows. First the bolts 32 and 34 in the indexing bars 30 and 31 are removed and these bars are pivoted up to the position as indicated in phantom in FIGURE 1 or as shown in FIGURE 11. Bolts 33 may be loosened to facilitate pivoting about these points. Bolts are then secured in the holes 35. As before, the clamping members are disengaged by raising the handles 39 and 43, and the hold-down cams 19 are disengaged by raising the handles 17 and 18, while the trimmer assembly 10 is moved out of the way to the rearmost position. Now as will be seen in FIGURE 11, a pair of workpieces 20c and 20d which have been rough cut on a 45° angle are inserted with their left-hand edges firmly abutting and aligned with the indexing bars 30 and 31. The inner or facing edges are abutted with one another and it will be noted that the tips of the pieces 20c and 20d are generally aligned but this alignment need not be precise. With the workpieces in position, the handles 39 and 43 are rotated to the down position, thus engaging the clamping assemblies 25 and 26, and again the handles 17 and 18 are rotated to the down position to press the hold-down cams 19 against the workpieces. The knob 65 on the cutter assembly 10 is now disengaged and the cutter assembly moved from right to left to make the cut. After removal, the two parts 20c and 20d will have precisely mating faces to be spliced together.

In either the 90° splice operation illustrated with reference to FIGURE 10, or the 45° splice operation illustrated with reference to FIGURE 11, the workpieces are removed from the mechanism by merely raising the handles 39 and 43 to the up position and likewise raising the handles 17 and 18 to the up position to free all of the clamps and hold-down cams.

While this invention has been described with reference to an illustrative embodiment, it will be of course understood that this description is not to be construed in a limiting sense. Other embodiments of the invention, as well as modifications of the disclosed embodiment, will be apparent to persons skilled in the art upon reading this specification. It is therefore contemplated that the appended claims will cover any such modifications or embodiments as may fall within the true scope of the invention.

What is claimed is:

1. A trimming mechanism comprising a generally flat bed having a centrally located channel, the bed accommodating a pair of thin workpieces with facing edges of the workpieces being positioned over said channel, elongated bearing means positioned above said bed and running parallel to said channel, a motor driven trimmer supported by said bearing means for traversing said channel in a position to engage said facing edges of the workpieces to perform the trimming operation on both of said workpieces at the same time, indexing means positioned at one side of said bed and having a given angular relationship to said channel for alignment of edges of said workpieces thereagainst, clamping means associated with said indexing means to hold the workpieces firmly in place, means positioned above said bed and running along generally parallel to said channel on each side thereof for pressing said workpieces firmly against said bed at a plurality of points, and a pair of hold-down rollers connected to said trimmer for engaging said workpieces on each side of said channel to press the workpieces firmly against said bed adjacent where the trimming operation occurs.

2. A mechanism according to claim 1 wherein the elongated bearing means includes a pair of shafts mounted in fixed positions above said bed with one shaft on each side of said channel, and said trimmer includes a support table riding on said shafts with a motor mounted on said table and having a trimmer blade coupled to the shaft thereof.

3. A mechanism according to claim 2 wherein the trimmer blade is conically shaped and is larger at the lower end whereby a reverse bevel trim is provided on said facing edges of said workpieces.

4. A mechanism according to claim 2 wherein said indexing means comprises a pair of thin elongated bars extending outwardly beyond said bed with means for anchoring said bars in at least two predetermined angular positions relative to said channel, clamping means being mounted on said bars at positions spaced from the bed.

5. A mechanism according to claim 2 wherein said means for pressing the workpieces against said bed includes a pair of elongated shafts mounted above said bed and running generally parallel to said channel on opposite sides thereof, such shafts being spaced outwardly from said elongated bearing means, said means further including a plurality of pressing elements each of which comprises a member fixed for rotation with the elongated shaft but adapted for sliding axially along the shaft and a resilient strip connected to the member at one end and curved to engage the workpiece, the shafts being mounted for rotation about their axes by manually operable means to a first position wherein said resilient strips of said pressing elements are in engagement with the workpieces and to a second position wherein the strips are spaced above the workpieces.

6. A mechanism according to claim 5 wherein resilient material is positioned in said bed beneath said plurality of points which are the areas where said strips engage the workpieces.

7. A mechanism according to claim 6 wherein the trimmer blade is conically shaped and is larger at the lower end whereby a reverse bevel trim is provided on said facing edges of said workpieces, and wherein said indexing means comprises a pair of thin elongated bars extending outwardly beyond said bed with means for anchoring said bars in at least two predetermined angular positions relative to said channel, the clamping means being mounted on said bars at positions spaced from the bed.

8. A mechanism for trimming the abutting edges of a pair of sheets of decorative laminate or the like which are to be spliced together comprising: a generally flat bed for accommodating said sheets and defining a channel in the central portion thereof, means positioned above said channel and having a fixed position relative to said bed for traversing a trimmer blade along said channel to simultaneously engage the edges of both of said sheets, a pair of indexing bars mounted at one side of said bed adjacent one end of said channel and bearing a fixed angular relationship to said channel, clamping means associated with said indexing bars for securing said sheets firmly against such bars, a plurality of hold-down cam means positioned above said bed spaced from said channel for pressing said sheets against said bed along the length thereof, and a pair of rollers mounted on said means adjacent said trimmer blade engageable with the top of said sheets on each side of said channel for pressing the sheets firmly against said bed in the vicinity of the trimmer blade.

9. A mechanism according to claim 8 wherein said means for traversing the trimmer blade includes a pair of elongated bearing shafts mounted in fixed positions above said bed with one shaft on each side of the channel parallel thereto, the trimmer blade being coupled to the shaft of a motor which is mounted on a motor table which rides along said elongated shafts.

10. A mechanism according to claim 9 wherein the trimmer blade is tapered to provide a reverse bevel on the edges of said workpieces.

11. A mechanism for trimming the abutting edges of a pair of thin sheets which are to be spliced together comprising: a generally flat bed having a centrally located channel, the bed accommodating the pair of sheets with facing edges of the sheets being positioned over said channel, elongated bearing means positioned above said bed and running parallel to said channel, a motor driven trimmer slidably supported by said bearing means for traversing said channel and including a rotary trimmer blade extending into said channel for engaging said facing edges of the sheets to thereby perform the trimming operation on both of said sheets at the same time, indexing means positioned at one side of bed and having a given angular relationship to said channel for alignment of edges of said sheets thereagainst, said indexing means including clamping means for holding the sheets aligned therewith, and means positioned above said bed spaced from said channel for pressing said sheets firmly against said bed at a plurality of points.

References Cited

UNITED STATES PATENTS

| | | | |
|---|---|---|---|
| 3,003,527 | 10/1961 | Fortune | 144—134 X |
| 3,209,800 | 10/1965 | Leibow | 144—134 |
| 3,344,819 | 10/1967 | Mitchell | 143—6 X |

ANDREW R. JUHASZ, *Primary Examiner.*

G. WEIDENFELD, *Assistant Examiner.*

U.S. Cl. X.R.

144—134